United States Patent
Oster et al.

(10) Patent No.: US 6,548,987 B1
(45) Date of Patent: Apr. 15, 2003

(54) HOLDER FOR RECHARGING A WIRELESS MICROPHONE

(75) Inventors: Doran Oster, Gainesville, FL (US); Gary Miller, Gainesville, FL (US)

(73) Assignee: Sabine, Inc., Alachua, FL (US)

( * ) Notice: Subject to any disclaimer, the term of this patent is extended or adjusted under 35 U.S.C. 154(b) by 0 days.

(21) Appl. No.: 10/061,317

(22) Filed: Feb. 4, 2002

(51) Int. Cl.⁷ .................................................. H01M 1/46
(52) U.S. Cl. ........................................ 320/114; 320/115
(58) Field of Search ................................. 320/107, 112, 320/113, 114, 115; 381/334, 91, 361, 366

(56) References Cited

U.S. PATENT DOCUMENTS

| | | |
|---|---|---|
| 3,436,482 A | 4/1969 | Pless et al. |
| 3,644,873 A | 2/1972 | Dalton et al. |
| 5,525,888 A | 6/1996 | Toya |
| 5,823,820 A | 10/1998 | Patel et al. |
| 5,881,156 A * | 3/1999 | Treni et al. |
| 6,138,041 A * | 10/2000 | Yahia |
| 6,195,572 B1 * | 2/2001 | Patterson et al. |
| 2001/0012347 A1 | 8/2001 | Rodemer |

* cited by examiner

Primary Examiner—Edward H. Tso
(74) Attorney, Agent, or Firm—Donald W. Marks

(57) ABSTRACT

A holder for a wireless microphone includes a pair of terminals electrically connected to a power supply and mounted in a recess of a holder member for engaging corresponding terminals on an elongated handle body of the wireless microphone. In one embodiment, the holder includes an axially offset opening, a rib, a groove or other orienting provision form mating with a corresponding axially offset protrusion, a groove, a rib or other mating orienting provision on the microphone handle body to ensure engagement of the microphone terminals with the holder terminals. In another embodiment, first terminals of the microphone and holder terminals are axially centered and second terminals of the microphone and holder terminals are offset from the axis with one of the second terminals being annular.

14 Claims, 2 Drawing Sheets

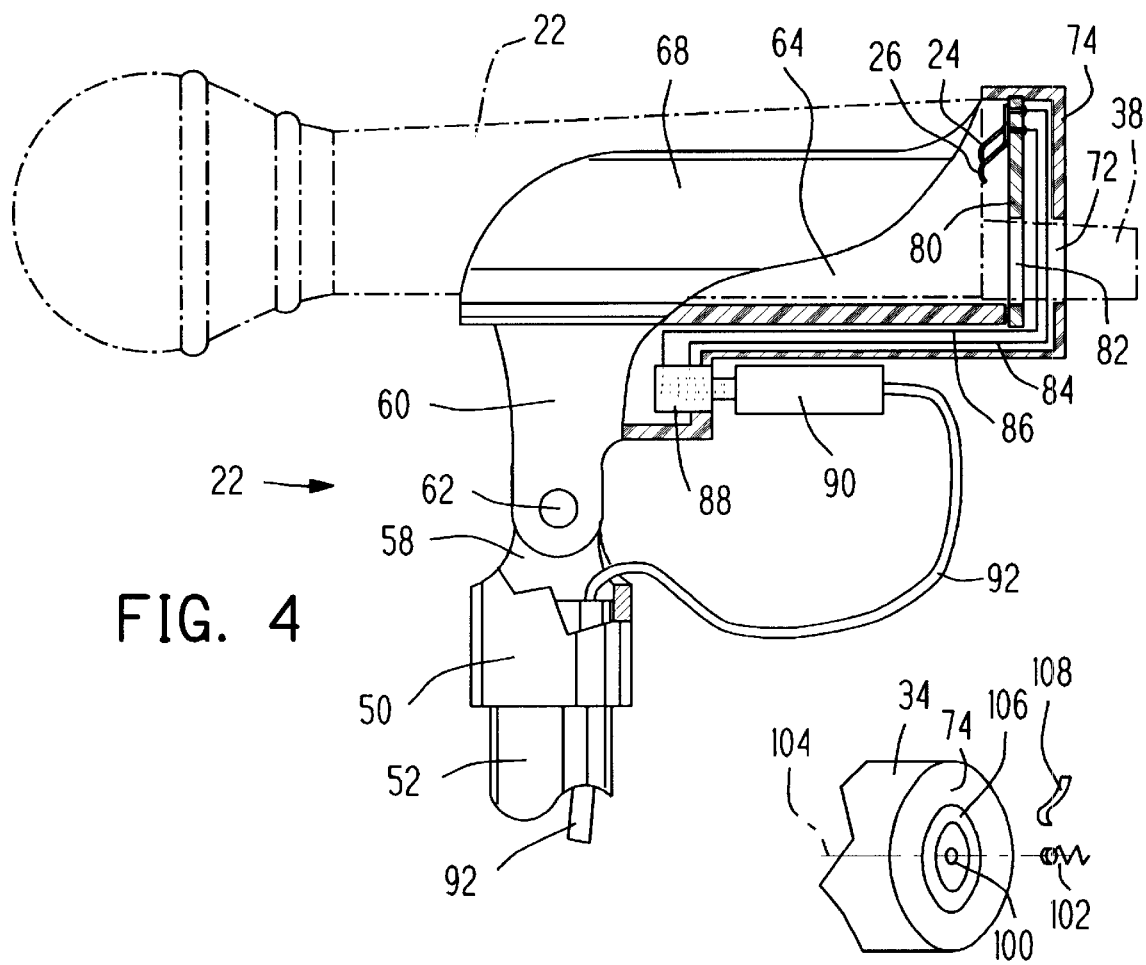
FIG. 4
FIG. 6
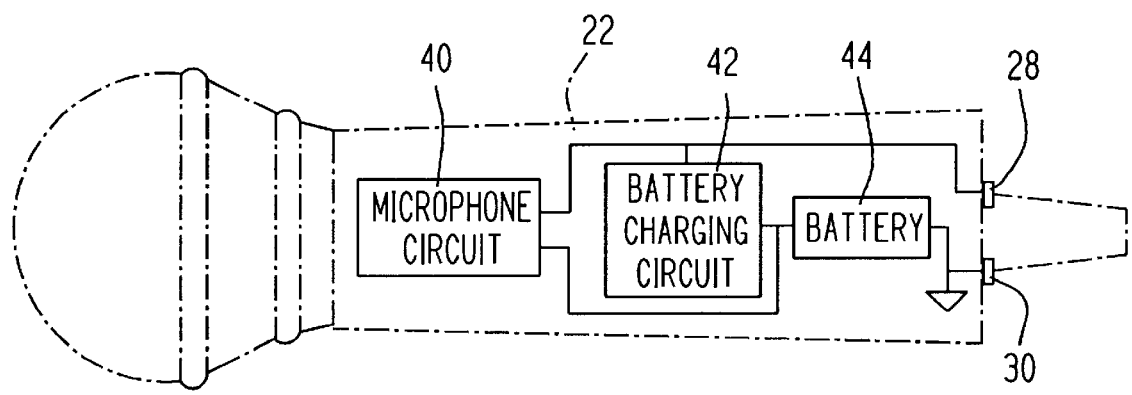
FIG. 5

HOLDER FOR RECHARGING A WIRELESS MICROPHONE

BACKGROUND

The present invention relates to holders for wireless microphones.

Wireless microphones require batteries to power their electronic components such as their transmitters. Most wireless microphones today require battery replacement after only a few hours of use. Such replacement is expensive, is time consuming, risks damaging the microphone and its components and burdens the environment with dead batteries. Some microphones can use rechargeable batteries which can be recharged in a separate recharging station.

Wireless telephones and cell phones generally have rechargeable batteries which can be recharged in their home station or by a separate recharging unit.

SUMMARY OF THE INVENTION

The present invention overcomes prior art deficiencies in recharging batteries in wireless microphones by providing a pair of electrical terminals in a standard microphone holder mountable on a stand and connected to a recharging power supply for recharging rechargeable batteries in the microphone during use or when the microphone is positioned for use. In one embodiment, the holder is designed to mate with the microphone only when the microphone is properly oriented to engage its recharging terminals with the terminals on the holder. In another embodiment, first terminals of each of the microphone and holder terminals are axially centered while the other of the microphone and holder terminals are axially offset with one axially offset terminal being annular to ensure contact with different microphone orientations in the holder.

An advantage of the present invention is that the microphone does not require any special handling or recharging unit. The user simply puts the microphone in its holder on the stand ready for use and the recharging begins automatically. The only special handling is when the rechargeable battery is replaced at the end of its life such as once every two or more years.

BRIEF DESCRIPTION OF DRAWINGS

FIG. 4 is a side elevation view, partially in section, showing internal wire connections of the holder.

FIG. 5 is a block diagram of circuitry in the wireless microphone superimposed on an outline of a top view of the microphone.

FIG. 6 is a schematic view of a modified arrangement of microphone and holder terminals.

DETAILED DESCRIPTION OF THE INVENTION

Figure 1:
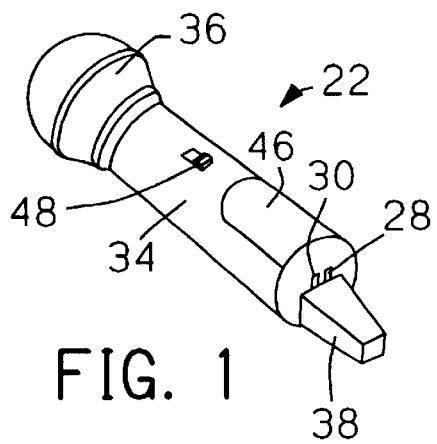
FIG. 1 is a perspective view of a wireless microphone that can be recharged with a holder in accordance with the present invention.
Figure 2:
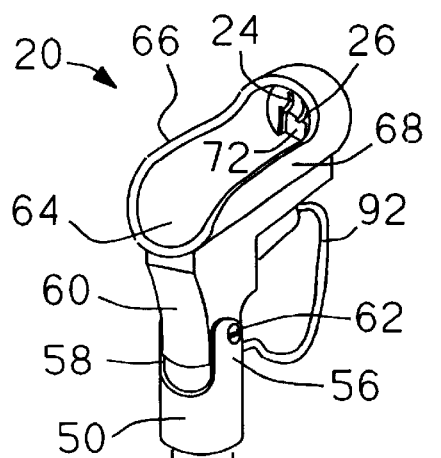
FIG. 2 is a perspective view, with a portion broken away, of a holder for a wireless microphone in accordance with the invention.
Figure 3:
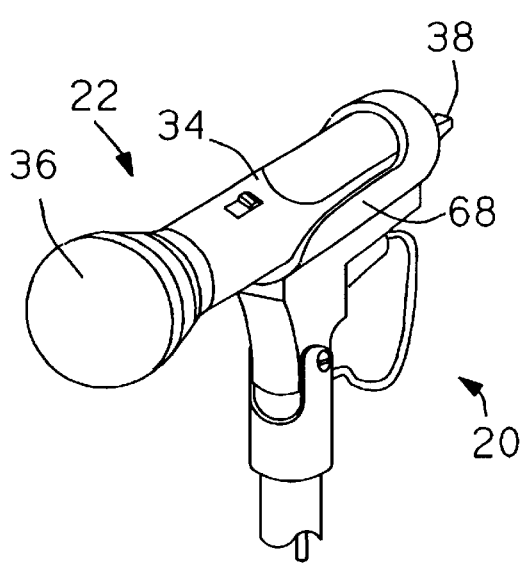
FIG. 3 is a perspective view showing the microphone of FIG. 1 inserted in the holder of FIG. 2.

One embodiment of the present invention includes a microphone holder, shown generally at 20 in FIG. 2, for holding a wireless microphone, generally shown at 22 in FIG. 1. The microphone 22 is shown seated in the holder 20 in FIG. 3. The holder 20 holds the microphone 22 in position for use by a user (i.e., the holder 20 is mounted on a conventional stand for supporting the microphone in front of a user's mouth, a musical instrument, etc.). The holder 20 includes a pair of electrical terminals 24 and 26 for engaging a corresponding pair of electrical terminals 28 and 30 on the microphone 22 to electrically connect a power supply 32 to the microphone 22 when the microphone is inserted in the holder 20. A suitable voltage is supplied by the power supply 32 to the microphone 22 to recharge a rechargeable battery or batteries in the microphone. The provision of the circuit in the holder 20 for supplying power to recharge the microphone batteries enables the recharging of the rechargeable battery or batteries in the microphone while the microphone is being used or is in position for use by the user. Thus the user does not have to remove the battery or batteries for recharging or replacement when the batteries become discharged.

The casing for the microphone is a handle body 34 with a sound receiving section 36 on one end of the handle body 34. The handle 34 is shown as having a generally round cross-section and as being tapered toward the sound receiving section 36 but could be any elongated shape which can be easily gripped by a performer's hand. Sound receiving portion 36 is shown as having a spherical or round bulbous shape but could be any shape configured to receive sound waves. The casing also includes an orienting feature such as a protrusion 38 extending from the handle 34 parallel to but offset from the axis of the handle section 34. The orienting feature is designed to mate with the holder 20 so as to permit the microphone to be received in the holder only when oriented to engage the microphone terminals 28 and 30 with the corresponding holder terminals 24 and 26. The protrusion 38 is shown as having a square cross-section and as being tapered for facilitating easy insertion into a corresponding opening in the holder. Alternatively, the protrusion 38 can have a cross section that is round, triangular, other polygonal, or a varied combination of cross-sectional shapes with or without tapering. Further, the orienting feature can be alternatively formed by grooves, ribs, etc. (not shown) on the handle body 34 or the handle 34 can be formed with a shape that fits in the holder 20 at only one orientation.

As shown in FIG. 5, the microphone 22 includes a microphone circuit 40, a battery charging circuit 42 and a battery 44. When the terminals 28 and 30 are energized, the microphone circuit 40 is powered by the voltage across the terminals 28 and 30, and when there is no voltage on terminals 28 and 30, the microphone circuit 40 is powered by the battery 44. The terminals 28 and 30 are connected to the battery charging circuit 42 that, in turn, is connected to the battery 44 for recharging the battery 44 when the battery becomes discharged. The microphone circuit 40 contains conventional wireless circuitry such as a transducer (not shown) to convert sound into an electrical signal, an optional amplifier (not shown) for amplifying the signal from the transducer, and a transmitter (not shown) connected to an antenna (not shown) for generating radio signals sent to a remote receiver and amplifying unit (not shown). The antenna may extend within the orienting protrusion 38. Optionally the microphone circuit can include a digital signal processor (not shown) for converting the signal into a digital signal that can be processed and transmitted to the remote receiver. Furthermore the microphone circuit can include an encoder (not shown) for encoding the transmitted signal. The battery charging circuit 42 can include circuitry or processing to determine the charged state and/or the type of battery 44 to prevent charging a non-rechargeable type of battery and/or to only recharge the battery 44 when its charged state is below a predetermined charge state. One suitable battery charging circuit is disclosed in U.S. Patent Application titled Battery Charging Control by Gary Miller and John Atkins filed herewith. The battery 44 can be a rechargeable battery especially made for the microphone or can be one or more conventional replaceable rechargeable batteries such as rechargeable type AA, AAA, C, D or 9-volt battery. For such a replaceable battery, the microphone 22 has a door 46, FIG. 1, which can be opened to replace the battery. A switch 48 is provided for turning the circuitry in the microphone, or a portion thereof, on and off.

The holder 20 includes a bracket 50 that is mounted on a tubular shaft 52 extending upward from a base 54. The tubular shaft 52 and base 54 form a stand supporting the holder in a raised position. The tubular shaft 52 can be formed by a pair of telescoping tubes (not shown) so that the holder 20 can be raised and lowered to set the holder at a desired height such as level with a user's mouth. Bracket 50 is also tubular and has a pair of upwardly extending supports 56 and 58 between which a lower extension 60 of an upper portion of the holder 20 is pivotally mounted by pivot pin 62 with a friction fit so that the upper portion of the holder can be set and retained at a desired angle. This upper portion of the holder has a recess 64 designed to receive an end portion of the handle 34 of the microphone 22. As illustrated, the holder recess 64 is open at one end and also along an upper side portion extending from the open end to form a pair of side wings or walls 66 and 68 extending from the closed end of the upper portion of the holder. The wings 66 and 68 are formed from a resilient material, such a plastic, and are formed to frictionally engage the microphone handle 34 to grip the microphone 22 sufficiently to prevent the microphone from falling from the holder 20 under the force of gravity but allowing the microphone to be removed and reinserted into the holder by the user. Alternatively gripping of the microphone handle 34 can be by a metal spring clip (not shown) mounted in the holder, by a pair of pivoted wings (not shown) which are spring biased to grip the microphone handle, by a manually operated or spring loaded cam or detent locking arrangement, or some other facility for releasably gripping or locking the microphone in the holder. The holder 20 can formed from non-plastic material such as metal.

An opening 72, FIGS. 2 and 4, is formed in an end wall 74 at the closed end of the holder recess 64 offset from the axis of the holder recess for mating with the protrusion 38 of the microphone to ensure proper orientation of the microphone 22 in the holder 20. When the protrusion 38 has a square cross-section as illustrated, the opening 72 is also square. For an alternative orienting feature such as a rib or groove on the handle body of the microphone or a handle shape, the side or bottom walls defining the recess 64 in the upper portion of the holder will have a mating groove, rib or recess shape to ensure proper orientation of the microphone in the holder.

The holder terminals 24 and 26 are mounted on a member 80 such as a printed circuit board secured in the recess 64 against or adjacent the end wall 74 of the upper holder portion. Opening 82 in the member 80 is aligned with the opening 72 in the wall 74. Electrical conductors 84 and 86 such as wiring paths on the member 80 and/or insulated wires connect the terminals 24 and 26 to respective male and female contact members in an electrical socket 88 mounted in the lower extension 60 of the upper holder portion. An electrical plug 90 has corresponding female and male contact members for removably mating with contact members of the socket 88. Various other types of mating electrical sockets and plugs, such as two or more prong connector, dual phone jack, etc., can be employed in place of the illustrated socket 88 and plug 90. The connecting members of the plug 90 are connected to insulated wires (not shown) in a cable 92 which is threaded through the bracket 50, the stand tube 52 and the base to the power supply 32. Alternatively the cable 92, near the top and/or bottom of the stand tube 52, can exit the stand tube through an opening (not shown) in the side of the tube 52, or can be entirely outside the stand and holder.

In a second embodiment shown in FIG. 6, the electrical terminals on the microphone body 34 and the holder include first terminals 100 and 102 of the microphone and holder terminals axially centered along axis 104 of the handle body and holder recess 64. Second terminals 106 and 108 of the terminals on the microphone body and the holder are offset from the axis 104 with one of the terminals 106 and 108 being annular so as to ensure that the microphone terminals engage the holder terminals when the microphone is placed in the holder. Although the annular terminal 106 is illustrated on the microphone body for engaging the spring terminal 108 on the holder, their positions can be reversed, i.e., the holder terminal 108 can be annular and the microphone terminal 106 can be a spring terminal. Similarly the axially centered microphone terminal 100 can be a spring terminal such as a pogo pin terminal with the holder terminal 102 being fixed instead of being a spring terminal.

The holder and the microphone can each have more than two electrical terminals for establishing electrical connections for functions in addition to power supply such as grounding, remote testing and control of battery charging, etc. Also the terminals can be mounted on a sidewall of the holder recess 64 for engaging microphone terminals mounted on the side of the microphone handle 34.

Additionally the holder 22 need not be pivotal but could have a fixed orientation and/or can be mounted by a clamp or a screw on a tubular or solid vertical shaft of a stand.

Since the embodiments described above are subject to many modifications, variations and changes in detail, it is intended that the above detailed description be interpreted only as illustrative and not limiting on scope of the invention.

What is claimed is:

1. A holder for a wireless microphone having an elongated handle body extending from a sound receiver and having a battery charging circuit with a pair of microphone terminals mounted on the handle body and connected to the battery charging circuit, the holder comprising:

a holder member mounted on a stand;

said holder member having a recess configured to receive the handle body of the microphone;

a pair of holder terminals mounted in the recess and adapted to engage the respective microphone terminals; and a power supply connected to the pair of holder terminals.

2. A holder for a wireless microphone as claimed in claim 1 wherein said holder recess is open at one end and along an upper side portion to form wings; said wings being designed to frictionally grip the handle body of the microphone.

3. A holder for a wireless microphone as claimed in claim 2 wherein the pair of holder terminals are mounted in the closed end of the recess for engaging microphone terminals on an end of the microphone handle body.

4. A holder for a wireless microphone as claimed in claim 1 wherein said recess of said holder member includes orienting means for mating with orienting means on the handle body of the microphone to ensure engagement of the microphone terminals with the holder terminals.

5. A holder for a wireless microphone as claimed in claim 4 wherein the holder orienting means comprises an opening in a wall at the closed end of the recess and offset from an axis of the recess for receiving an orienting protrusion extending from the microphone handle body offset from the axis of the handle body.

6. A holder for a wireless microphone as claimed in claim 5 wherein the holder orienting opening is square for receiving the microphone orienting protrusion which has a tapered square cross-section and extends parallel the axis of the microphone handle body.

7. A holder for a wireless microphone as claimed in claim 1 further comprising:

an electrical socket having a pair of electrical contact members and being mounted in the holder member;

a pair of electrical conductors connecting the pair of socket electrical contact members to the corresponding holder terminals;

an electrical plug for removably mating with the electrical socket and having a pair of electrical contact members for engaging the corresponding socket electrical contact members; and a cable having a pair of wires connecting the power supply to the holder terminals.

8. A holder for a wireless microphone as claimed in claim 7 further comprising a stand having a base and a vertical tubular support mounted on the base and pivotally supporting the holder member wherein the cable is threaded through the vertical tubular support and the base.

9. A holder for a wireless microphone as claimed in claim 7 wherein said holder recess is open at one end and along an upper side portion to form wings; said wings being resilient and formed to frictionally grip the handle body of the microphone.

10. A holder for a wireless microphone as claimed in claim 9 wherein the pair of holder terminals are mounted in the closed end of the recess for engaging microphone terminals on an end of the microphone handle body.

11. A holder for a wireless microphone as claimed in claim 10 wherein the holder orienting means comprises an opening in a wall at the closed end of the holder recess and offset from an axis of the holder recess for receiving an orienting protrusion extending from the microphone handle body offset from the axis of the handle body.

12. A holder for a wireless microphone as claimed in claim 11 wherein the holder orienting opening is square for receiving the microphone orienting protrusion which has a tapered square cross-section and extends parallel the axis of the microphone handle body.

13. A holder as claimed in claim 1 wherein the pair of holder terminals are mounted on a printed circuit member secured in a closed end of the holder recess for engaging the microphone terminals on an end of the microphone handle body.

14. A holder as claimed in claim 7 wherein the pair of holder terminals are mounted on a printed circuit member secured in a closed end of the holder recess for engaging the microphone terminals on an end of the microphone handle body, and the pair of electrical conductors connecting the pair of socket electrical contact members to the corresponding holder terminals included printed circuit paths on the printed circuit member.

* * * * *